United States Patent
Yamauchi et al.

[11] Patent Number: 5,267,339
[45] Date of Patent: Nov. 30, 1993

[54] OPTICAL FIBER HAVING A CORE WITH A REPEATEDLY CHANGING CONSTITUTIONAL PARAMETER

[75] Inventors: Ryozo Yamauchi; Akira Wada; Tetsuo Nozawa; Daiichirou Tanaka; Tetsuya Sakai, all of Sakura, Japan

[73] Assignee: Fujikura Ltd., Tokyo, Japan

[21] Appl. No.: 895,480

[22] Filed: Jun. 8, 1992

[30] Foreign Application Priority Data
Jun. 11, 1991 [JP] Japan .................. 3-166403

[51] Int. Cl.⁵ .................... G02B 6/02
[52] U.S. Cl. .................... 385/123; 385/146
[58] Field of Search .......... 385/123, 126, 127, 128, 385/146; 264/1.5

[56] References Cited

U.S. PATENT DOCUMENTS

| | | | |
|---|---|---|---|
| 3,966,446 | 6/1976 | Miller | 65/2 |
| 4,163,370 | 8/1979 | Kurth | 264/1.5 |
| 4,447,124 | 5/1984 | Cohen | 385/123 |
| 4,573,163 | 2/1986 | Kaminow | 372/96 |
| 4,665,660 | 5/1987 | Jablonski et al. | 385/123 |
| 4,933,815 | 6/1990 | Parthasarathy | 385/142 |
| 5,151,966 | 9/1992 | Brehm et al. | 385/141 |

FOREIGN PATENT DOCUMENTS 1-004709  9/1989  Japan.
2162440   2/1986  United Kingdom.

Primary Examiner—Frank Gonzalez
Assistant Examiner—Stephen W. Barns
Attorney, Agent, or Firm—Sprung Horn Kramer & Woods

[57] ABSTRACT

The present invention is directed to an optical fiber comprising a core and a cladding layer wherein at least one of the constitutional parameters thereof changes along the longitudinal direction of the optical fiber. In order to present a useful optical fiber wherein the occurrence of a Brillouin scattering is prevented, an optical fiber having altered constitutional parameters is found to be effective. The constitutional parameters mean the parameters which determine the constitution of the optical fiber and is capable of influencing the condition of electromagnetic wave transmitting therethrough such as light or acoustic wave. The constitutional parameters include diameter of the core, index of refraction of the core, diameter of the optical fiber, composition of the glass, residual stress of the core. Some examples are disclosed about their manufacturing process and the test results. Much improvement was measured, especially in the use for a single mode optical fiber.

12 Claims, 7 Drawing Sheets

OPTICAL FIBER HAVING A CORE WITH A REPEATEDLY CHANGING CONSTITUTIONAL PARAMETER

BACKGROUND OF THE INVENTION

The present invention relates to optical fibers for use in light transmission wherein the range of spectral bandwidth of the light source is narrow and the power of the light injected to the optical fibers is large; these optical fibers can prevent the occurrence of the induced Brillouin scattering.

In accordance with the advance of optical technology, a high energy light source is easily obtainable through an optical amplification method, this light source also has a narrow spectral bandwidth of less than several 10 MHz. An optical fiber having a transmission-loss ratio which almost equals the theoretical ratio, i.e., 0.20 dB/km, is also producible in a mass production. As a result of these improvements, an unrepeated transmission distance can be increased up to about 300 km. As an optical fiber for use in a transmission network system, a single mode optical fiber is employed.

However, when strengthening the intensity of the input light to the optical fiber in order to further lengthen the transmission distance, when the intensity of the light is greater than a certain threshold value, non-linear optical effects occur, such as Laman scattering, induced Brillouin scattering, and Four-Photon Mixing. In these effects, the induced Brillouin scattering and the Four-Photon mixing can be observed in a relatively low intensity range of input light. By using a coherent light of the source which has a smaller spectral bandwidth of about several hundred MHz, which corresponds to Brillouin's bandwidth, an induced Brillouin scattering can be easily observed.

The induced Brillouin scattering is a phenomenon in which light is scattered by a slight deviation of frequency which is caused by a longitudinal acoustic wave in the glass constituting the optical fiber. The light is scattered in a direction in which the phase of the incident rays and the scattered light coincide. On the other hand, the natural frequency of the acoustic wave in the optical fiber is in the range of several GHz to several tens of GHz, and the transmission velocity thereof is about several thousand m/min. Therefore, the direction in which the interaction between the incident light and the acoustic wave is maximum is the direction opposite to that of incident light; the result is that the scattered light returns from the inside of the optical fiber to the incident end thereof.

FIG. 4 illustrates a measuring system for measuring the amount of light scattered by induced Brillouin scattering. The measuring system is comprised of a signal source 4, an optical amplifier 5, and an optical fiber loop 7 connected to one another via a branching optical coupler 6. By this construction, the measuring system can measure the amount of light generated by induced Brillouin scattering, which is scattered in a backward direction from the optical fiber loop 7 and is branched by the branching optical coupler 6. In the FIG. 4, a transmission of signal light is indicated by continuous lines and a transmission of light of induced Brillouin scattering is indicated by chained lines. The signal light is injected from the signal source 4 into the measuring system and amplified by the optical amplifier 5, is further branched by the branching optical coupler 6. Thus, a small part of the incident light is guided to an optical power meter 1 and detected thereby, and the larger part of the incident light is guided to the optical fiber loop 7 and injected thereto. In the optical fiber loop 7, the incident light generates Brillouin scattering, and the light transmitted through the optical fiber loop 7 in the forward direction is injected into the optical power meter 2 and is detected thereby. The light scattered in the backward direction is guided to the optical power meter 3 via the optical coupler 6 and is detected thereby.

By using the measuring system having this construction, the intensity of Brillouin scattering was measured around the conventional optical fiber. The construction parameters of the optical fiber are shown below. The optical fiber is connected to the measuring system, and the quantity of both the transmission light detected by the optical power meter 2 and the scattered light detected by the optical power meter 3 are respectively measured while the supply of the incident light is altered. The optical coupler 6 splits the injected light at a constant ratio so that the quantity of incident light can be estimated by the quantity measured by the optical power meter 1.

CONVENTIONAL EXAMPLE

| | |
|---|---|
| Outer Diameter | 125 $\mu$m |
| Core Diameter | 9 $\mu$m |
| Deviation of the Core Diameter | <0.1 $\mu$m |
| Deviation of the Core Diameter | <0.1 $\mu$m |
| Difference of the Specific Refraction Ratio between Core and Cladding layer | <0.01% |
| Length of Optical Fiber | about 40 km |

The measurement results of the conventional example are illustrated in the FIG. 5 by chain lines. In FIG. 5, the quantity of incident light is plotted on the x-axis, and the quantities of the light transmitted in the forward direction and the light scattered in the rearward direction are respectively plotted on the right and left y-axis, thus the relationship of the changes of quantity of forward transmission light and rearward scattered light to that of the incident light into the optical fiber is illustrated.

FIG. 5 shows that in a small range of the quantity of incident light, the quantity of the scattered light in the rearward direction and the incident light are proportional and linear. In this range, Rayleigh scattering was observed in which frequency and wave length of the scattered light are the same as those of the incident light. On the other hand, when gradually increasing the quantity of incident light, although the quantity of the scattered light concomitantly increases at first, the quantity begins to increase sharply when the incident light quantity reaches a certain value. In this induced Brillouin scattering, frequency of the scattered light differs slightly from that of the incident light. The generation of scattered light begins to increase by induced Brillouin scattering at a threshold value of 7.5 dBm.

Measurements were taken of optical fibers having different constitutional parameters. By the results of such measurement, the threshold value was smaller in the case of a single mode optical fiber than in a case of a multiple mode optical fiber, since the power density of light injected into the core is higher in the former than in the latter, thus-induced Brillouin scattering occurs at a smaller quantity of incident light. It was also found that the threshold value is small when the ratio of index of refraction between the core and the cladding layer is large, or when the diameter of the core is small.

In a long-distance transmission, a single mode optical fiber is used in general. However, when injecting light of more than several dBm from the light source having a spectral bandwidth smaller than 100 MHz into the single mode optical fiber, a significant quantity of light returns to an opposite direction, i.e., toward the incident end of the optical fiber after scattering. For instance, when injecting 20 dBm light, about 19.5 dBm light returns to the incident end by scattering. Thus, even when injecting a large quantity of light into the conventional optical fiber, it cannot be transmitted therethrough; therefore, the transmission distance without a repeater cannot be lengthened.

This invention was done on the above background, and the object of the present invention is to provide an optical fiber for use in transmitting a light of narrow spectral bandwidth and high power, in which generation of induced Brillouin scattering is restricted, and an enlarged transmission distance without a repeater can be obtained.

SUMMARY OF THE INVENTION

According to the present invention, at least one of the constitution parameters of the optical fiber is varied along its length. Therefore, by using the optical fiber of the present invention, when injecting a large quantity of light, unfavorable nonlinear effects caused by longitudinal acoustic waves such as induced Brillouin scattering, can be reduced. Thus, a long-distance transmission of more than 300 km can be obtained without the need for repeaters by using light of a narrow spectral bandwidth. It is also possible to inject and transmit a light of significantly high quantity level of more than 20 dBm by connecting the optical fiber of the present invention to an incident side of a transmission system.

Furthermore, coherent transmission is possible by using such a narrow spectral bandwidth, in which improvement of about 20 dB is obtained compared to the conventional intensity modulation and direct detection method to realize a long distance transmission with a high accuracy.

DESCRIPTION OF THE PREFERRED EMBODIMENTS

The preferred embodiment of the present invention will be described below.

Figure 6:
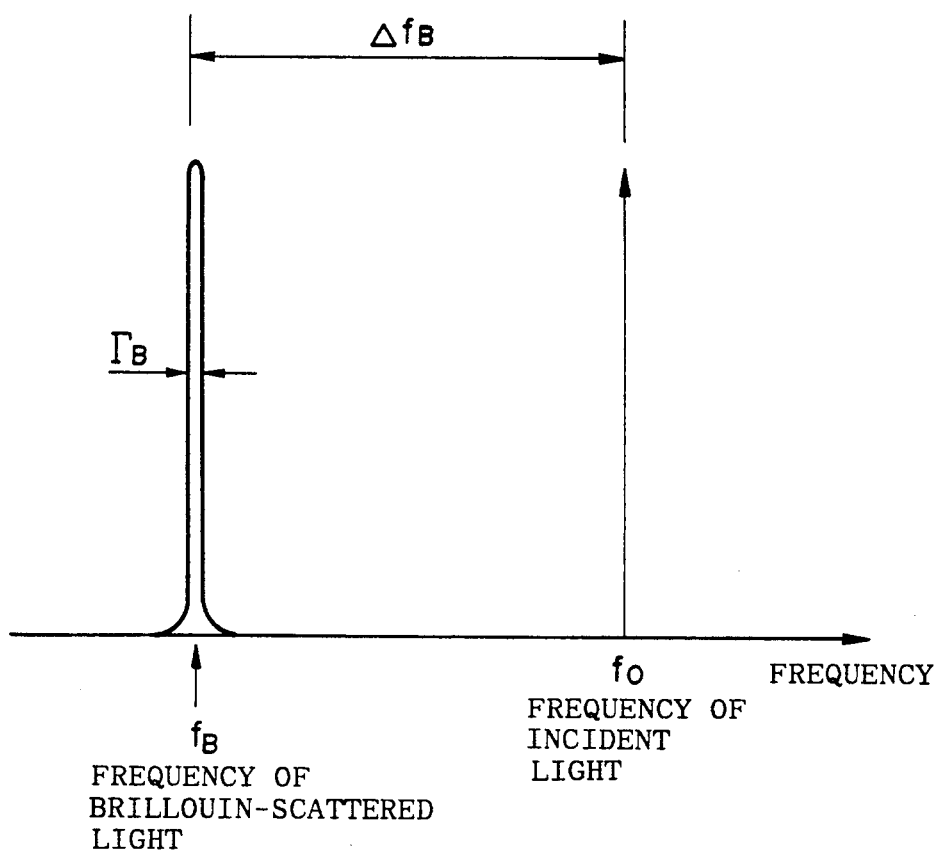
FIG. 6 is a graph schematically showing a change of frequency and frequency bandwidth generated by induced Brillouin scattering.

The induced Brillouin scattering is a phenomenon in which light is scattered by slight deviation of frequency caused by longitudinal acoustic waves in glass which constitutes the optical fiber. The change of frequency and frequency bandwidth was detected by the following method. The measuring light of a sufficiently narrow spectral bandwidth smaller than several MHz was injected into the optical fiber, and variation of frequency of the scattered light was observed. Frequency of the scattered light (shown as fB in FIG. 6) was shifted and became smaller than that of the incident light (shown as f0 in FIG. 6) according to the frequency of the acoustic wave. The quantity of the shift of frequency (called "Brillouin shift frequency" hereafter and indicated as ΔfB in the figures) was of several GHz, which was much smaller than the frequency of several hundred THz used in ordinary optical communication. The gained frequency bandwidth (shown as ΓB in the figure) was of several tens of MHz.

The observation was carried out on many kinds of optical fibers. The Brillouin shift frequency ΔfB varied according to the change of quantity of constitutional parameters such as diameter of the core, index of refraction of the core, diameter of the optical fiber, composition of the glass, or residual stress of the core. The gained frequency bandwidth ΓB was observed to be significantly narrowed when an optical fiber had uniform constitutional parameters along its length and was very long. Therefore, the quantity of induced Brillouin scattering was found to be dependent on the constitutional parameters of the optical fiber and the uniformness thereof along its length.

The optical fiber of the present invention has nonuniform constitutional parameters along its length. The term "constitutional parameters" indicates the parameters which determine the constitution of the optical fiber and are capable of influencing the condition of electromagnetic waves transmitting therethrough such as light or acoustic waves. The constitutional parameters include the diameter of the core, index of refraction of the core, diameter of the optical fiber, composition of the glass, and residual stress of the core. It is possible to alter one or more parameters simultaneously, and the selection of them or the altering conditions can be determined suitably.

Furthermore, the alternation of such parameters can be performed in such a manner that they change gradually and unidirectionally from one end of the optical fiber to the other; however, it is also possible to have them change in a cyclic manner so that the invention will be applicable to optical fibers for a long-distance transmission. It is also possible to alter the parameters such as the residual stress of the core according to a rectangular wave or triangular wave.

Although the invention may be used for both the single mode optical fiber and the multiple mode optical fiber, a rather large effect can be obtained in the single mode optical fiber in which a threshold for induced Brillouin scattering is low. The term "single mode optical fiber" described here means an optical fiber capable of substantially being used in a single mode transmission, and includes an optical fiber which can also be used in a secondary mode transmission when it can be deemed as a single mode optical fiber because of its short distance attenuation as much as 1 km.

An optical fiber having an altered core diameter along the longitudinal direction can be obtained by changing the forming conditions of the optical fiber suitably in its formation process. An optical fiber having an altered index of refraction can be obtained by changing the supplied amount of doping elements or changing the type thereof.

An optical fiber having altered residual stress can be obtained by changing the tensile force in the drawing formation process when manufacturing a single mode optical fiber from starting material.

Figure 7:
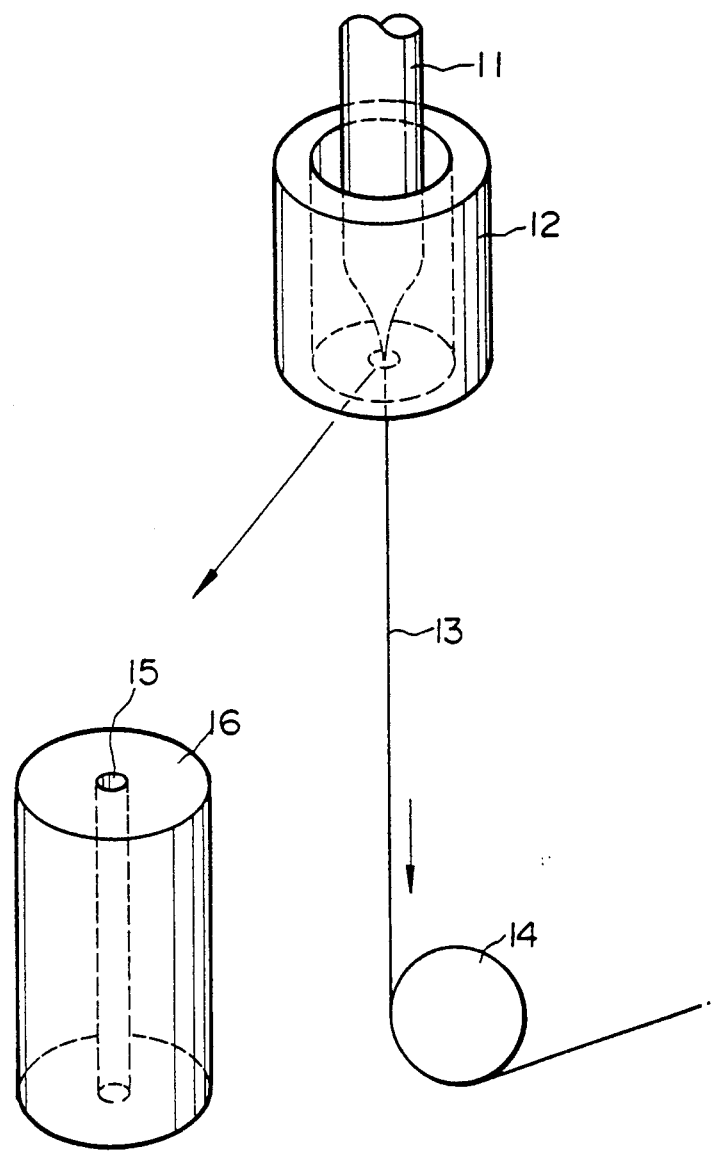
FIG. 7 is a schematic view showing a wire drawing apparatus for manufacturing optical fibers.

A schematic configuration of a drawing process and a drawing apparatus for optical fibers is shown in FIG. 7. A starting material 11 having a core-clad construction is charged into a heating furnace 12 and heated at about 2000 degrees centigrade to be softened. Subsequently, the starting material is drawn by a drawer 14 through a drawing nozzle so as to elongate the material and decrease its diameter. The viscosity of the base material 11 is adjusted in advance by adjusting the selection of doping elements and/or the amount of supply thereof so that the viscosity of the core 15 becomes larger than that of the cladding layer 16. As shown in the enlarged view in FIG. 7, the material having decreased diameter is solidified to form an optical fiber 13. In this process, the core 15 is first solidified, then the cladding layer 16 is solidified later; this is because the viscosity of the glass material of the core 15 differs from that of the cladding layer 16.

In an optical fiber thus obtained, since the core has an extremely small cross-sectional area compared to that of the cladding layer, i.e., approximately 0.5 to 1.0% thereof, the drawing force acts selectively on the core 15. The core 15 is elastically extended since the core 15 is solidified and the cladding layer 16 is still plastic. Subsequently, as the cladding layer 16 at the corresponding location is solidified, the core 15 is fixed in a state that the tensile force is still acting. Therefore, the core 15 of the obtained optical fiber has residual stress in a longitudinal direction according to the tensile force in the drawing process. This tensile force can be changed by altering the drawing velocity or the temperature of the heating furnace continuously or cyclically. The amount of the residual stress of the optical fiber can be predicted theoretically by the following equation (I), and the Brillouin shift frequency $\Delta fB$ by equation (II).

$$\delta\epsilon = \frac{1}{E_1}\left(\frac{A_2 E_2}{A_1 E_1 + A_2 E_2}\right)\left(\frac{\delta F}{A_1}\right)\left(1 + \frac{\eta_2 A_2}{\eta_1 A_1}\right)^{-1} \quad (I)$$

wherein
$\delta\epsilon$: variation width of residual stress
1: core, 2: cladding layer
A: cross-sectional area
E: Young's Modulus
$\eta$: glass viscosity at high temperature
$\delta F$: variation width of drawing force $$\frac{\delta(\Delta fB)}{\Delta fBO} = 4.65\delta\epsilon \quad (II)$$

wherein
$\Delta fB$: Brillouin shift frequency
$\Delta fBO$: Brillouin shift frequency before alteration As described above, by adjusting constitutional parameters such as diameter of the core, index of refraction of the core material, the amount of residual stress in the core, diameter of the optical fiber, or the composition of the glass material suitably along the longitudinal direction of the optical fiber, the Brillouin shift frequency $\Delta fB$ can be controlled so as to prevent the occurrence of induced Brillouin scattering.

Alternatively, by adopting a material having a relatively large index of diffraction in the glass constituting the core of the optical fiber, and by altering the amount of the doping elements added along the longitudinal direction, the transmission velocity of the acoustic wave in the core can be changed so as to control the Brillouin shift frequency to suppress the induced Brillouin scattering.

FIRST EXAMPLE

Figure 1:
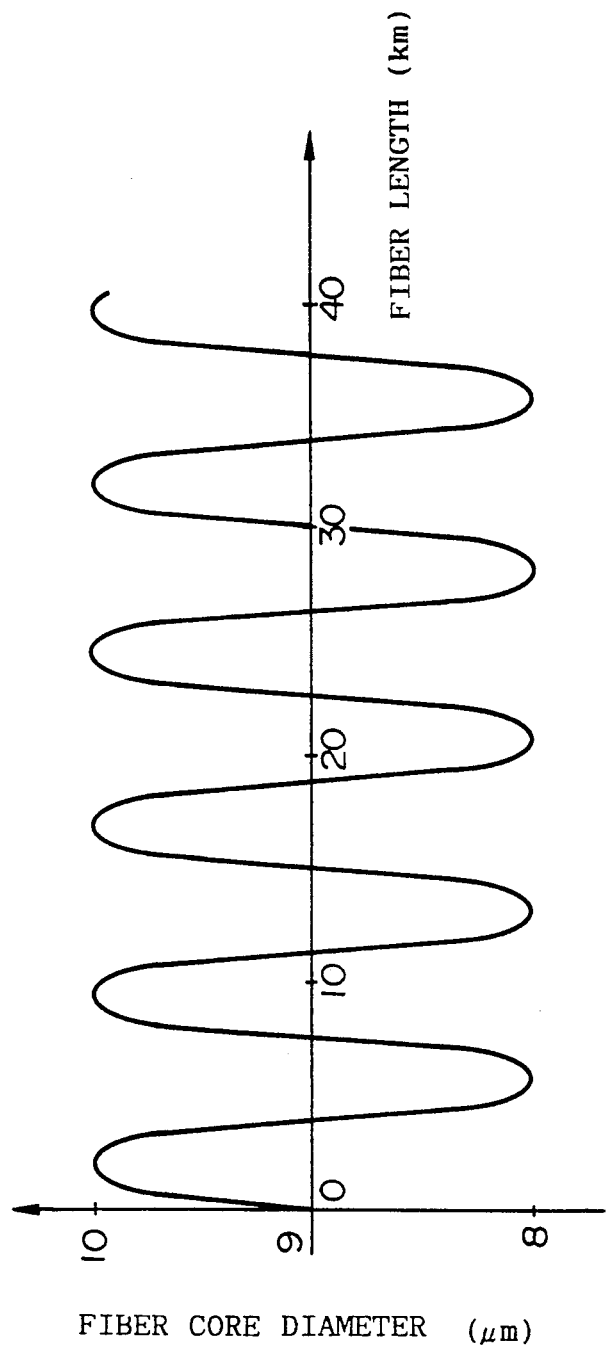
FIG. 1 is a graph showing a deviation of core diameter of an optical fiber of the first embodiment according to the present invention.

The first example is an optical fiber having altered diameter along the longitudinal direction. FIG. 1 is a graph showing the variation of the diameter of the example, wherein the x-axis depicts length of the optical fiber, and the y-axis depicts diameter of the core. The single mode optical fiber is manufactured through the ordinary VAD method from the quartz glass, wherein the accumulation conditions of the glass particles are controlled so as to alter the diameter of the core in a sine curve along the longitudinal direction of the optical fiber. The constitutional parameters of the optical fiber are as follows:

| | |
|---|---|
| Outer Diameter | 125 μm |
| Diameter of the Core | 9 ± 1 μm |
| Wavelength of Variation of the Diameter of the Core | about 4 to 6 km |
| Ratio of Index of Refraction between the Core and the Cladding Layer | 0.37% |
| Composition of the Core Glass | Germanium-doped Quartz Glass |
| Composition of the Cladding Glass | Pure Quartz Glass |
| Length of the Optical Fiber | about 40 km |

Figure 4:
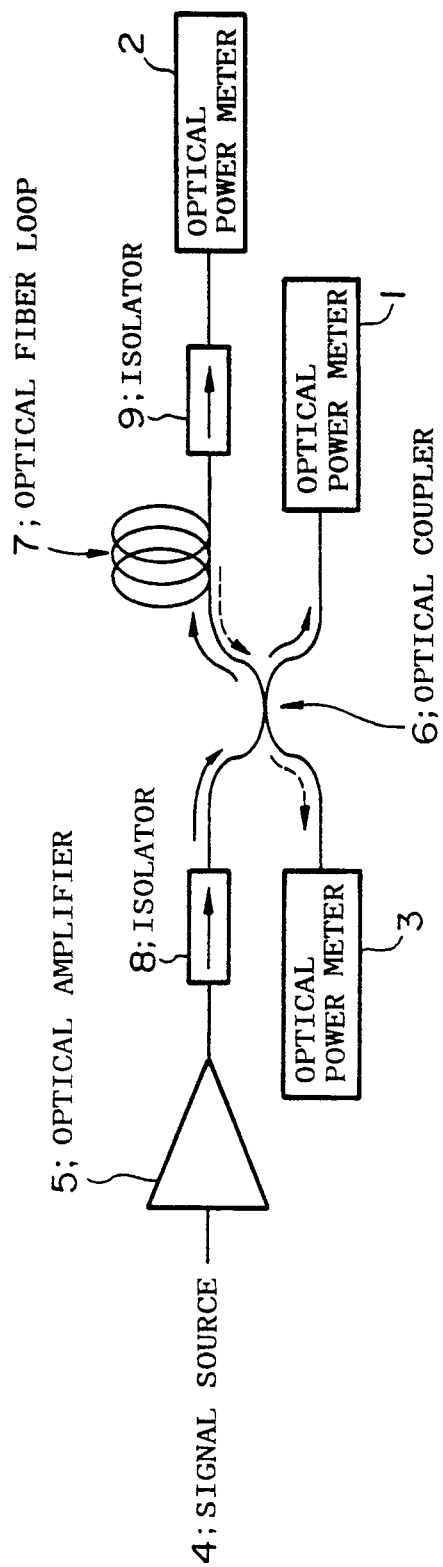
FIG. 4 is a schematic view showing a measuring system for measuring induced Brillouin scattering.

As a result of measurement of the induced Brillouin scattering by the measuring system shown in FIG. 4, the threshold was found to be about 9 dBm.

SECOND EXAMPLE

Figure 2:
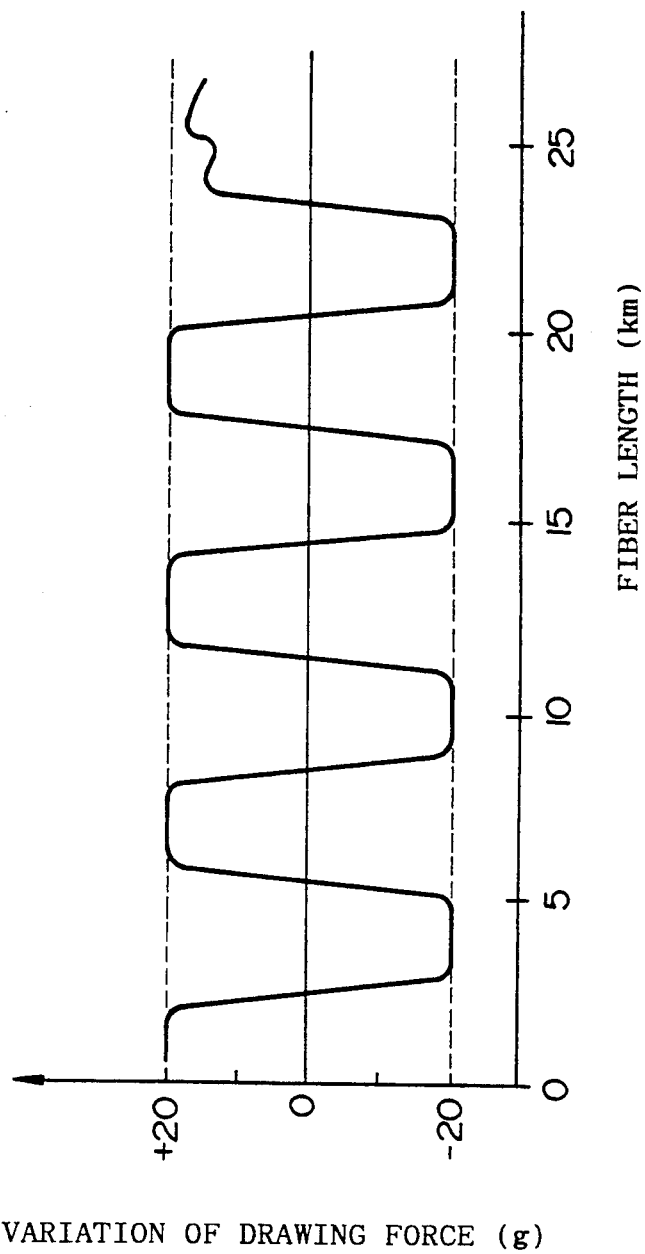
FIG. 2 is a graph showing variation of the drawing force acting on the core in the second embodiment of the invention.

An optical fiber having altered residual stress along the longitudinal direction was manufactured. FIG. 2 is a graph showing variation of the tensile force added to the base material for optical fiber in the drawing process as illustrated in FIG. 7, wherein the x-axis depicts fiber length and the y-axis depicts tensile force relative to a standard tensile force. The base material 11 was produced by the conventional process and formed into an optical fiber 15 of a single mode through a drawing process wherein the tensile force was altered in a rectangular wave so that the residual stress occurs therein. The constitutional parameters of the optical fiber are as follows:

| | |
|---|---|
| Outer Diameter | 125 μm |
| Diameter of the Core | 9 μm |
| Ratio of Index of Refraction between the Core and the Cladding layer | 0.38% |
| Composition of the Core Glass | Pure Quartz Glass |
| Composition of the Cladding Glass | Fluoride Added Quartz |

-continued

| | Glass |
|---|---|
| Diameter of the Mode Field | about 10 μm |
| Transmission Loss | about 0.178 dB/km |
| Length of the Optical Fiber | about 50 km |
| Variation of Drawing Tensile Force | 40 g |

Figure 5:
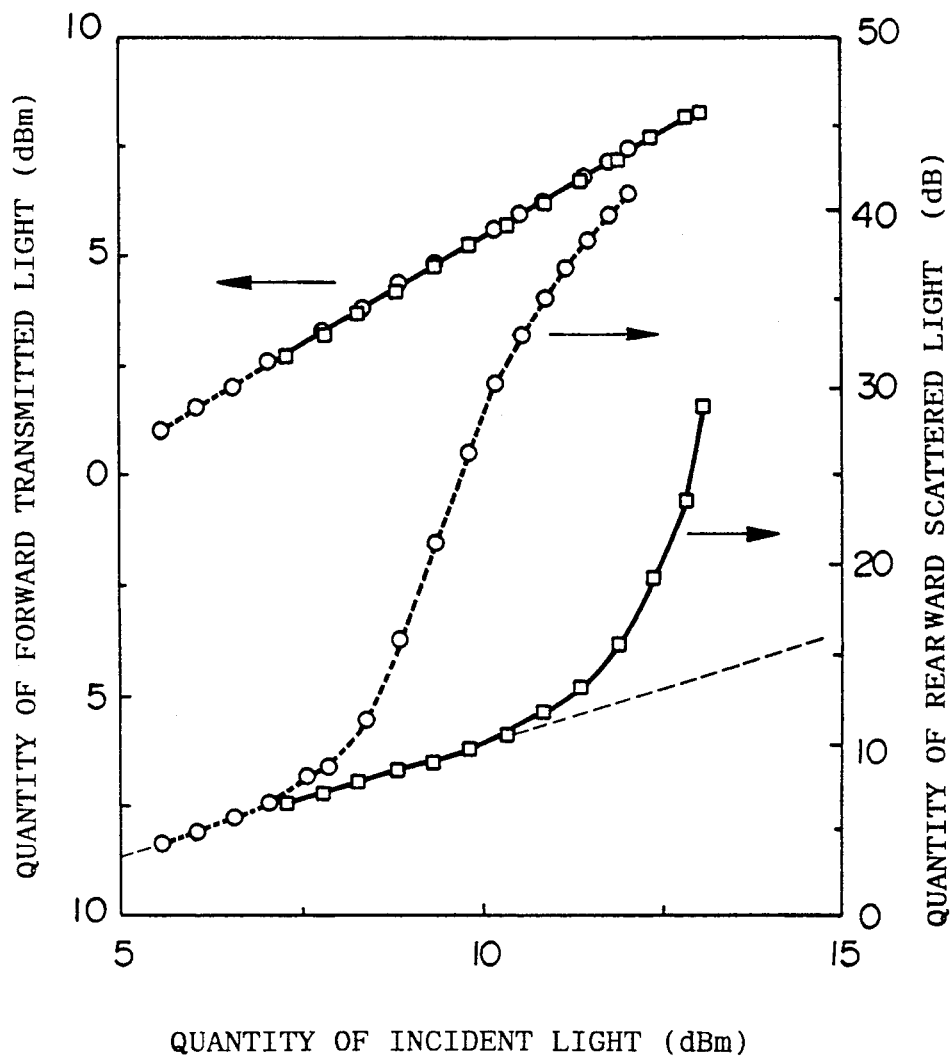
FIG. 5 is a graph showing change of quantity of a forward transmitted light and rearward scattered light against a change of quantity of incident light.

The amount of induced Brillouin scattering was measured by the measuring system shown in FIG. 4. The result is shown in FIG. 5 by continuous lines. The threshold of induced Brillouin scattering of the optical fiber of this example is 11.5 dBm.

THIRD EXAMPLE

Figure 3:
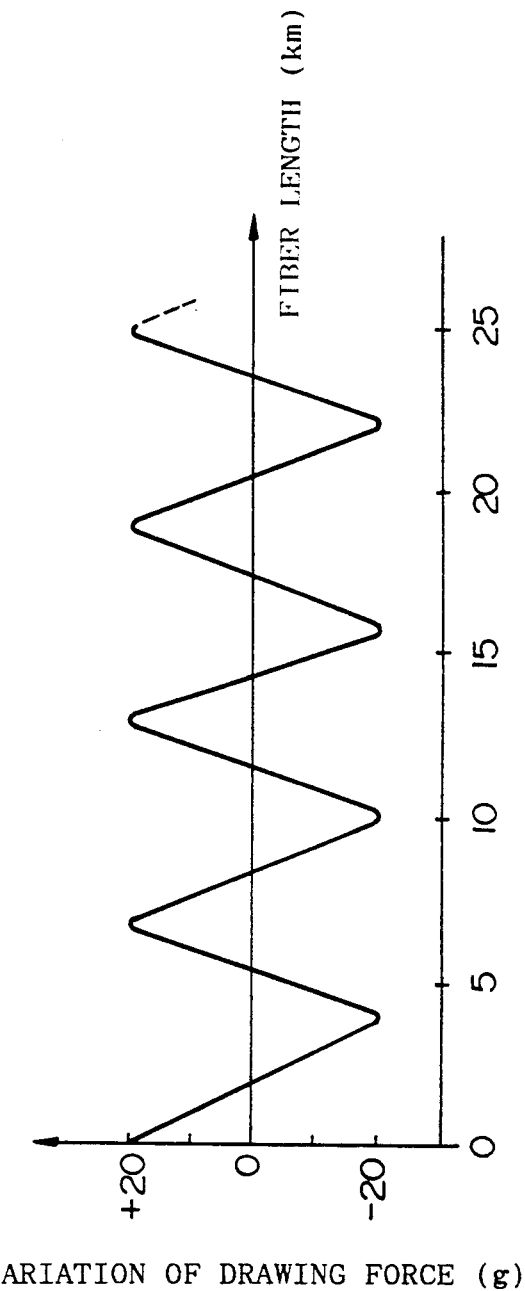
FIG. 3 is a graph showing variation of the drawing force acting on the core in the third embodiment of the invention.

The optical fiber of the third example was obtained by the same process as the second example except that the drawing force was altered in accordance with the triangular wave as shown in FIG. 3 instead of the rectangular wave.

By the result of measurement by the measuring system of FIG. 4, the threshold of induced Brillouin scattering is approximately 20 dBm.

As explained above, by altering the constitutional parameters along the longitudinal direction of the optical fiber, the threshold of the induced Brillouin scattering was fairly improved compared to that of conventional optical fiber, i.e., 7.5 dBm.

What is claimed is:

1. A single-mode quartz glass optical fiber for use in light transmission comprising a core and a cladding layer wherein at least one of constitutional parameters of the core changes repeatedly along the longitudinal direction of the optical fiber.

2. A single-mode quartz glass optical fiber according to claim 1, wherein the diameter of the core changes along the longitudinal direction of the optical fiber.

3. A single-mode quartz glass optical fiber according to claim 2, wherein the diameter of the core changes cyclically along the longitudinal direction of the optical fiber.

4. A single-mode quartz glass optical fiber according to claim 3, wherein the diameter of the core changes according to a sine curve along the longitudinal direction of the optical fiber.

5. A single-mode quartz glass optical fiber according to claim 1, wherein the index of refraction of the core changes along the longitudinal direction of the optical fiber.

6. A single-mode quartz glass optical fiber according to claim 5, wherein the index of refraction of the core changes cyclically along the longitudinal direction of the optical fiber.

7. A single-mode quartz glass optical fiber according to claim 1, wherein the residual stress in the core changes along the longitudinal direction of the optical fiber.

8. A single-mode quartz glass optical fiber according to claim 7, wherein the residual stress in the core changes cyclically along the longitudinal direction of the optical fiber.

9. A single-mode quartz glass optical fiber according to claim 8, wherein the residual stress in the core changes according to a rectangular wave along the longitudinal direction of the optical fiber.

10. A single-mode quartz glass optical fiber according to claim 8, wherein the residual stress in the core changes according to a triangular wave along the longitudinal direction of the optical fiber.

11. In the transmission of light employing a quartz glass optical fiber, the improvement which comprises utilizing as said fiber a fiber according to claim 1.

12. An optical fiber comprising a core and a cladding layer wherein the residual stress in the core changes cyclically according to a triangular wave along the longitudinal direction of the optical fiber.

* * * * *